United States Patent
Cao et al.

(10) Patent No.: US 10,581,042 B2
(45) Date of Patent: Mar. 3, 2020

(54) END PLATE OF BATTERY MODULE AND BATTERY MODULE

(71) Applicant: CONTEMPORARY AMPEREX TECHNOLOGY CO., LIMITED, Ningde (CN)

(72) Inventors: Gen Cao, Ningde (CN); Shubing You, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 256 days.

(21) Appl. No.: 15/818,131

(22) Filed: Nov. 20, 2017

(65) Prior Publication Data
US 2018/0183025 A1    Jun. 28, 2018

(30) Foreign Application Priority Data
Dec. 27, 2016    (CN) .................... 2016 2 1443282 U

(51) Int. Cl.
*H01M 2/10*    (2006.01)

(52) U.S. Cl.
CPC ....... *H01M 2/1094* (2013.01); *H01M 2/1061* (2013.01); *H01M 2/1077* (2013.01)

(58) Field of Classification Search
None
See application file for complete search history.

(56) References Cited

U.S. PATENT DOCUMENTS

| | | | |
|---|---|---|---|
| 6,376,126 B1 * | 4/2002 | Faust | H01M 2/024 429/176 |
| 2005/0058899 A1 * | 3/2005 | Rivetta | H01M 2/024 429/176 |

(Continued)

FOREIGN PATENT DOCUMENTS

| | | |
|---|---|---|
| CN | 205 790 141 U | 12/2016 |
| EP | 2 819 210 A1 | 12/2014 |

(Continued)

OTHER PUBLICATIONS

Extended European Search Report from corresponding European Patent Application No. 17203228.6, dated Mar. 23, 2018, 9 pages.

(Continued)

*Primary Examiner* — Haroon S. Sheikh
(74) *Attorney, Agent, or Firm* — Tucker Ellis LLP

(57) ABSTRACT

The present application relates to the technical field of batteries and, particularly, relates to an end plate of a battery module and a battery module. The end plate of a battery module includes a main body and an energy absorbing body, the energy absorbing body includes an acting portion and a connecting portion, the acting portion protrudes in a direction from the main body toward a battery, and the acting portion is connected with the main body through the connecting portion. After the battery module is assembled, if the battery of the battery module expands and applies an expansion force to the end plate, then the energy absorbing body will deform elastically, so as to absorb the expansion force of the battery. Therefore, the end plate can prevent the housing of the battery module from failure, so as to improve structural strength of the battery module.

9 Claims, 3 Drawing Sheets

(56) References Cited

U.S. PATENT DOCUMENTS

| | | | | |
|---|---|---|---|---|
| 2009/0148754 A1* | 6/2009 | Marchio | ............. | H01M 2/1077 |
| | | | | 429/83 |
| 2013/0164592 A1* | 6/2013 | Maguire | ............. | H01M 2/1077 |
| | | | | 429/120 |
| 2013/0273412 A1* | 10/2013 | Okada | .................. | H01M 2/206 |
| | | | | 429/158 |
| 2014/0030566 A1* | 1/2014 | Lee | ..................... | H01M 2/1016 |
| | | | | 429/90 |
| 2014/0295227 A1* | 10/2014 | Aoki | .................. | H01M 2/1016 |
| | | | | 429/82 |
| 2015/0004469 A1* | 1/2015 | Park | .................... | H01M 2/1077 |
| | | | | 429/151 |
| 2015/0340669 A1 | 11/2015 | Sadayuki | | |
| 2016/0240827 A1 | 8/2016 | Sakurai | | |
| 2016/0308242 A1* | 10/2016 | Ju | ....................... | H01M 2/1016 |
| 2017/0352850 A1* | 12/2017 | Nagane | ............... | H01M 2/1077 |

FOREIGN PATENT DOCUMENTS

| | | |
|---|---|---|
| EP | 2 958 165 A1 | 12/2015 |
| EP | 3 270 439 A1 | 1/2018 |
| WO | 2016/084272 A1 | 6/2016 |

OTHER PUBLICATIONS

Decision to grant a European Patent from corresponding European Patent Application No. 17203228.6, dated Sep. 19, 2019, 2 pages.

* cited by examiner

END PLATE OF BATTERY MODULE AND BATTERY MODULE

CROSS-REFERENCE TO RELATED APPLICATIONS

The present application claims the benefit of priority to Chinese Patent Application No. 201621443282.3, filed on Dec. 27, 2016, the content of which is incorporated herein by reference in its entirety.

TECHNICAL FIELD

The present application relates to the technical field of batteries and, particularly, relates to an end plate of a battery module and a battery module.

BACKGROUND

The housing is one of the core components of a battery module, the interior of the housing forms space for accommodating the battery. A traditional housing of a battery module mainly includes a pair of side plates, a pair of end plates, a bottom plate and a top plate. The end plates are fixed with the side plates through welding, screw threads etc. As continuous increasing of capacity of the battery module, the expansion force applied to the housing by the battery in the housing is also continuously increasing, which may easily cause deformation and displacement of the end plate, leading to connection failure between the side plates and the end plates (such as welding seam failure between the side plates and the end plates, bolt connection failure between the side plates and the end plates caused by an overlarge shearing force). Therefore, traditional battery modules have the problem of low structural strength.

SUMMARY

The present application provides an end plate of a battery module and a battery module, so as to improve structural strength of the battery module.

A first aspect of the present application provides an end plate of a battery module, including a main body and an energy absorbing body, the energy absorbing body includes an acting portion and a connecting portion, the acting portion protrudes in a direction from the main body toward a battery, and the acting portion is connected with the main body through the connecting portion.

Preferably, the main body has a connecting hole, the energy absorbing body is arranged at the connecting hole, and a surface of the energy absorbing body facing toward the connecting hole is a concave surface.

Preferably, a through hole is defined in the connecting portion, the through hole is communicated with the connecting hole.

Preferably, an auxiliary deforming hole is defined in the acting portion, and the auxiliary deforming hole penetrates through the acting portion.

Preferably, the connecting portion is structured in a strip shape, one end of the connecting portion is fixedly connected with the main body, and the other end of the connecting portion is fixed at an edge of the acting portion.

Preferably, the connecting portion is obliquely arranged relative to a protruding direction of the acting portion, and the end of the connecting portion connected with the acting portion is closer to the acting portion than the other end of the connecting portion.

Preferably, a plurality of energy absorbing bodies is arranged, and the plurality of energy absorbing bodies is arranged on the main body and is spaced from each other.

Preferably, a surface of the acting portion of each energy absorbing body away from the main body is a flat surface, and the flat surfaces of all the acting portions are parallel and level to each other.

A second aspect of the present application provides a battery module, including a rigid end plate and a plastic end plate, the plastic end plate is arranged between a battery in the battery module and the rigid end plate, and the rigid end plate is any one of the end plate of a battery module as mentioned above.

Preferably, the plastic end plate includes a plastic main body and a cooperative protruding portion fixed with the plastic main body, the cooperative protruding portion protrudes from the plastic main body toward a side close to the rigid end plate, and the cooperative protruding portion abuts with the acting portion.

The technical solution provided by the present application can reach the following beneficial effects:

The end plate of a battery module provided by the present application includes a main body and an energy absorbing body, after the battery module is assembled, if the battery of the battery module expands and applies an expansion force to the end plate of a battery module, then the energy absorbing body will deform elastically, so as to absorb the expansion force of the battery. Therefore, the end plate of a battery module can prevent the housing of the battery module from failure, so as to improve structural strength of the battery module.

It should be understood that, the above general description and the following detailed description are just exemplary, which cannot limit the present application.

REFERENCE SIGNS

Figure 1:
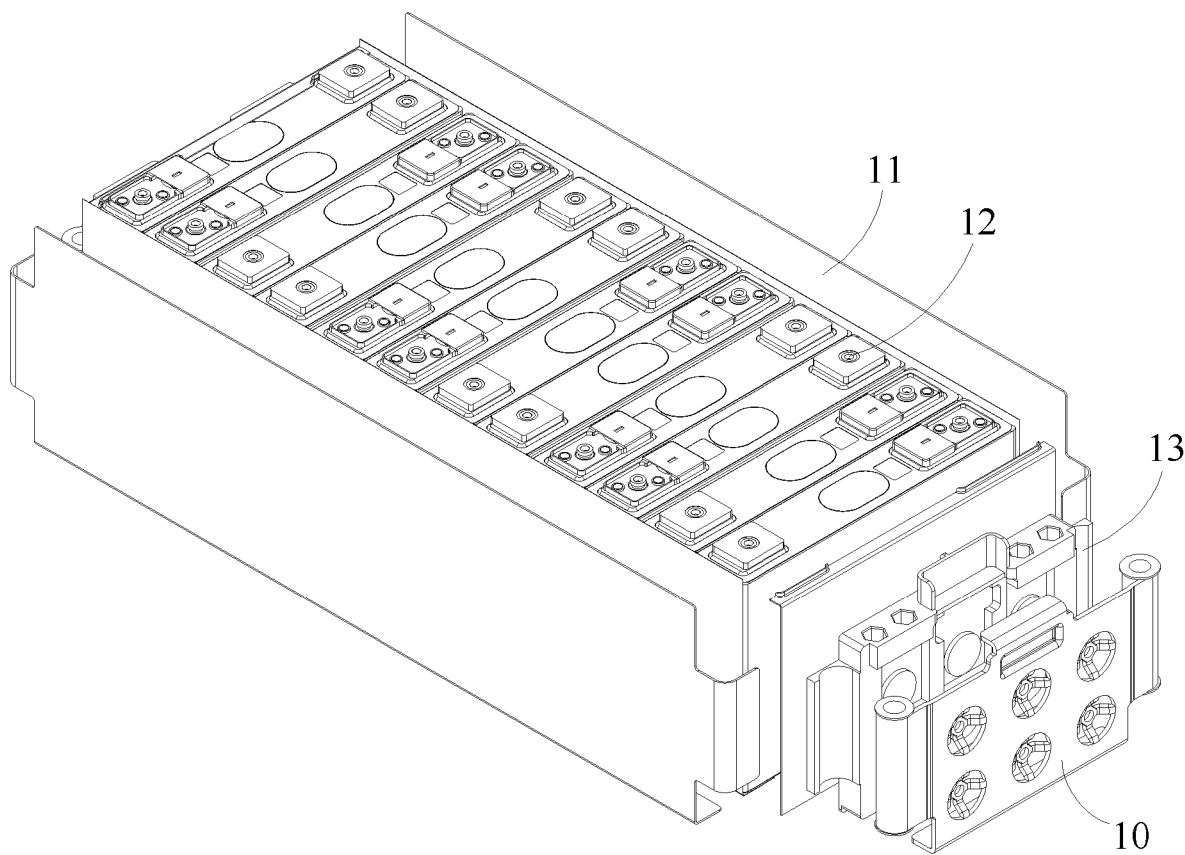
FIG. 1 is a structural schematic diagram of a battery module provided by an embodiment of the present application.
Figure 2:
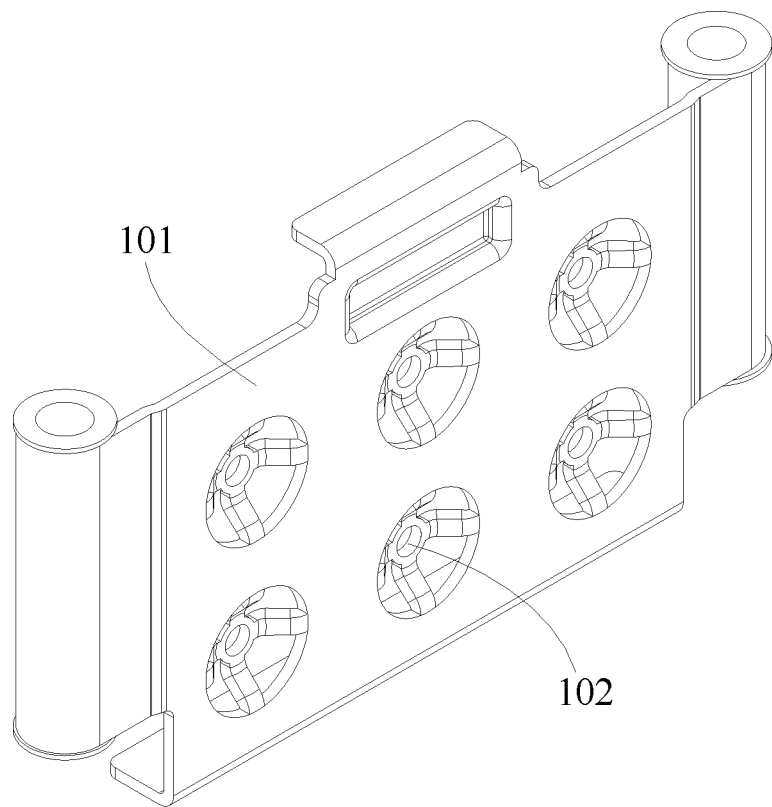
FIG. 2 is a structural schematic diagram of an end plate of a battery module provided by an embodiment of the present application.
Figure 3:
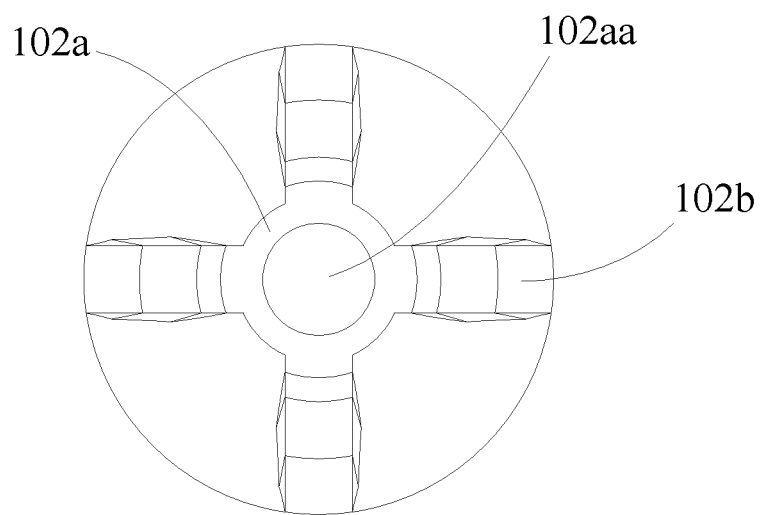
FIG. 3 is a partial schematic diagram of an energy absorbing body in an end plate of a battery module provided by an embodiment of the present application.
Figure 4:
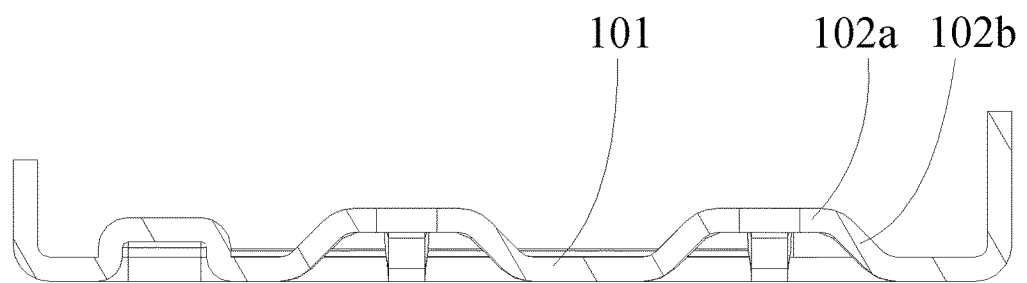
FIG. 4 is a sectional view of an end plate of a battery module provided by an embodiment of the present application.

10—end plate of battery module;
101—main body;
102—energy absorbing body;
102*a*—acting portion;
102*aa*—auxiliary deforming hole;
102*b*—connecting portion;
11—side plate;
12—battery;
13—plastic end plate;

130—plastic main body;
131—cooperative protruding portion.

The drawings are incorporated into the present description and form a part thereof, which show embodiments of the present application, and are used to explain the principle of the present application together with the description.

DESCRIPTION OF EMBODIMENTS

The present application will be described in further detail with reference to the following embodiments and the accompany drawings.

As shown from FIG. 1 to FIG. 6, embodiments of the present application provide an end plate 10 of a battery module, the end plate 10 forms a housing of the battery module together with side plates 11, a bottom plate and a top plate. A battery 12 of the battery module can be placed in the housing.

The above-mentioned end plate 10 can include a main body 101 and an energy absorbing body 102. The main body 101 is the main structure of the end plate 10, and the main body 101 can be welded with the side plate 11. The energy absorbing body 102 can be arranged on the main body 101, specifically, the energy absorbing body 102 can be welded on the main body 101, or the energy absorbing body 10 and the main body 101 are integrated as a whole, or they are connected with each other adopting other manners.

The energy absorbing body 102 can include an acting portion 102a and a connecting portion 102b. The acting portion 102a protrudes from the main body 101 toward a side where the battery 12 is located. At this time, a surface of the acting portion 102a facing toward the battery 12 forms a first-stage stress surface, and a surface of the main body 101 facing toward the battery 12 forms a second-stage stress surface. The acting portion 102a is connected with the main body 101 through the connecting portion 102b, so that the entire energy absorbing body 102 has certain elastic deformation amount relative to the main body 101. That is, after bearing an external force, the energy absorbing body 102 can absorb the external force through self-deformation, so as to avoid problems such as deformation and displacement of the end plate 10 as well as fracture of a fastening piece in the battery module caused by shearing force.

After the battery module is assembled, if the battery 12 of the battery module expands, and applies an expansion force to the end plate 10, then the energy absorbing body 102 will deform elastically, so as to absorb the expansion force of the battery 12. Therefore, the end plate 10 can prevent the housing of the battery module from failure, so as to improve structural strength of the battery module. Moreover, the end plate 10 can release the expansion force of the battery 12, so as to prolong the service life of the battery module.

Besides, the above-mentioned first-stage stress surface and second-stage stress surface can be formed on the above-mentioned end plate 10, the expansion force of the battery 12 is firstly absorbed by the first-stage stress surface, so as to reduce the expansion force, the remaining expansion force is then transferred to the second-stage stress surface, so that the deformation amount of the end plate 10 is smaller, or even no deformation will occur.

In order to further improve the elastic deformation ability of the energy absorbing body 102, a connecting hole can be defined in the main body 101, and the energy absorbing body 102 is arranged at the connecting hole. Specifically, the connecting portion 102b can be fixed at an edge of the connecting hole. After such arrangement, the rigidity of a position of the main body 101 where the energy absorbing body 102 is arranged will be reduced due to the connecting hole. As a result, after the energy absorbing body 102 has absorbed the expansion force, the deformation magnitude of the energy absorbing body 102 will be larger, so as to achieve the above-mentioned purpose. Further, a surface of the energy absorbing body 102 facing toward the connecting hole can be provided to be a concave surface, a concave direction of the concave surface is a direction close to the battery. After providing the concave surface, the thickness of the energy absorbing body 102 is smaller, so that the energy absorbing body 102 is more easily deformed, thereby absorbing more expansion force.

Further, a through hole can be defined in the connecting portion 102b, the through hole is communicated with the connecting hole. Adopting such a structure can allow larger elastic deformation amount of the connecting portion 102b, so as to better optimize performance of the energy absorbing body 102.

After the battery module is assembled, the above-mentioned acting portion 102a can directly contact with the battery 12, so as to bear the expansion force of the battery 12. An auxiliary deforming hole 102aa can be further defined in the acting portion 102a. The auxiliary deforming hole 102aa penetrates through the acting portion 102a, so that the acting portion 102a has a larger elastic deformation after being stressed. Specifically, the auxiliary deforming hole 102aa can be a round-hole, square-hole, oval-hole and the like, which can be located at the central portion of the acting portion 102a.

In embodiments of the present application, the deformation ability of the energy absorbing body 102 is related to the structure of the connecting portion 102b. Generally, if other factors are not taken into consideration, the higher the rigidity of the connecting portion 102b is, the worse the deformation ability of the energy absorbing body 102 is; on the contrary, the lower the rigidity of the connecting portion 102b is, the higher the deformation ability of the energy absorbing body 102 is. Accordingly, the connecting portion 102b can be structured as a strip shape, one end of the connecting portion 102b is fixedly connected with the main body 101, the other end is fixed at an edge of the acting portion 102a. Comparing to other structures, the connecting portion 102b adopting the strip-shaped structure can properly reduce the rigidity thereof, so as to achieve the effect of improving the deformation ability of the energy absorbing body 102.

Furthermore, the connecting portion 102b is obliquely arranged relative to the protruding direction of the acting portion 102a, and the end of the connecting portion 102b connected with the acting portion 102a is closer to the acting portion 102a than the other end. That is, the entire energy absorbing body 102 presents a gradual contraction structure along a direction close to the battery 12. When adopting such a structure, in order to guarantee the structural strength of the energy absorbing body 102, a plurality of connecting portions 102b can be arranged in interval along the edge of the acting portion 102a. Further, connecting portions 102b are uniformly arranged along the edge of the acting portion 102a. When the connecting portion 102b adopts a straight strip-shaped structure, the connecting portion 102b forms an inclining angle α relative to the protruding direction of the acting portion 102a.

Figure 5:
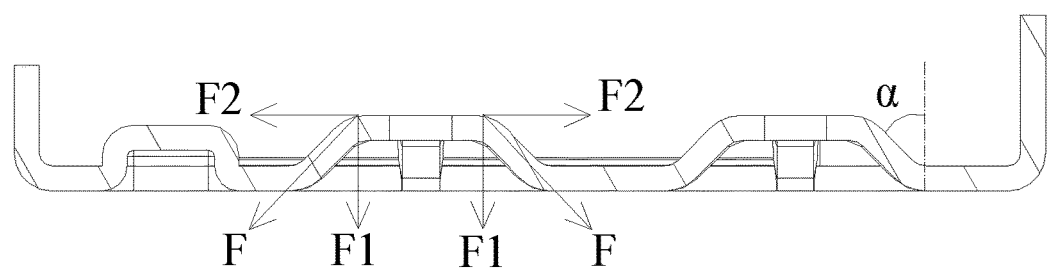
FIG. 5 is a schematic view showing analysis of partial force stressed by an end plate of a battery module provided by an embodiment of the present application.

As shown in FIG. 5, after adopting the above-mentioned structure, the expansion force F stressed by the energy absorbing body 102 can be decomposed into two component forces, respectively F1 and F2. The F2 of opposite directions can counteract each other, so as to further reduce the expansion force stressed by the entire end plate 10. Since the inclining angle α of the connecting portion 102b determines the magnitude of the component forces F1 and F2, therefore, the value of the inclining angle α can be designed according to the expansion force transferred onto the end plate 10 and the rigidity parameter of the end plate 10, etc. The larger the expansion force is, the larger the rigidity is required, then the inclining angle α can adopt a larger value, so that the component force F2 is larger; otherwise, a smaller value shall be adopted. Considering various requirements, in embodiments of the present application, the inclining angle α can be set as 30°-45°.

One or more energy absorbing body 102 can be provided. In order to improve the energy absorbing effect of the energy absorbing body 102, a plurality of energy absorbing bodies 102 can be provided, the energy absorbing bodies 102 are arranged on the main body 101 in interval. Further, in each energy absorbing body 102, a surface of the acting portion 102 away from the main body 101 can be provided to be a flat surface, so as to simplify processing of the end plate 10 and, at the same time, appropriately increase a stress area of the acting portion 102a when bearing the expansion force. Furthermore, the above-mentioned flat surfaces of the acting portions 102b are parallel and level to each other, so as to strengthen the ability of the end plate 10 on bearing the expansion force.

It shall be understood that, factors such as the number of the above-mentioned connecting portion 102b, the size of the above-mentioned connecting portion 102b, the number of the above-mentioned energy absorbing body 102 and the interval between each two adjacent energy absorbing bodies 102 and the like will influence the ability of the end plate 10 on absorbing the expansion force. Therefore, when designing the structure of the end plate 10, the structure of the end plate 10 can be appropriately arranged by taking parameters such as application scenario of the battery module, structure of the battery module and the like into consideration.

Figure 6:
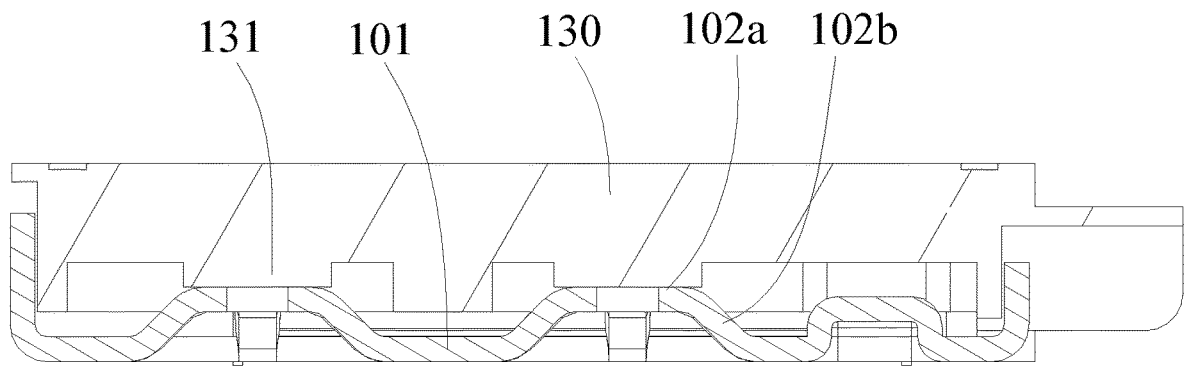
FIG. 6 is a schematic diagram showing cooperation of an end plate of battery module and a plastic end plate provided by an embodiment of the present application.

Based on the above-mentioned structure, as shown in FIG. 1 and FIG. 6, embodiments of the present application also provide a battery module. The battery module can include a rigid end plate and a plastic end plate 13. The plastic end plate 13 can be placed between the battery 12 and the rigid end plate, the material of the rigid end plate can be steel. Specifically, the rigid end plate can be the end plate 10 described in any one of the above embodiments. The plastic end plate 13 can firstly bear a part of expansion force, the remaining expansion force will be transferred onto the rigid end plate, and absorbed by the energy absorbing body 102 of the rigid end plate.

In the above-mentioned battery module, the plastic end plate 13 cooperates with the rigid end plate, when the rigid end plate adopts the above-mentioned end plate 10 provided by the embodiments of the present application, the plastic end plate 13 can include a plastic main body 130 and a cooperative protruding portion 131 fixed with the plastic main body 130. The cooperative protruding portion 131 protrudes relative to the plastic main body toward a side close to the rigid end plate, and the cooperative protruding portion 131 abuts with the acting portion 102a of the rigid end plate.

Preferably, the abutting surface between the above-mentioned cooperative protruding portion 131 and the acting portion 102a is a first flat surface, that is, both the cooperative protruding portion 131 and the acting portion 102a have the first flat surface, the first flat surfaces are fitted with each other. A surface of the main body 101 of the rigid end plate facing toward the plastic end plate 13 is a second flat surface, the first flat surface and the second flat surface are parallel to each other. Such an arrangement can allow the end plate 10 more effectively bearing the expansion force, and prevent the battery module from moving relative to the plastic end plate 13 after bearing the expansion force. Therefore, such an arrangement can further improve the reliability of the housing. Alternatively, both the above-mentioned two first surfaces can adopt a round surface.

In an embodiment, in a direction of the plastic end plate 13 opposite to the rigid end plate, a preset gap is defined between the portion of the plastic end plate 13, except the cooperative protruding portion 131, and the rigid end plate. Such a solution, in one aspect, can provide space for the deformation of the energy absorbing body 102 of the rigid end plate and, in the other aspect, can prevent the expansion force stressed by the plastic end plate 13 from being directly transferred to the rigid end plate.

The above are just the preferred embodiments of the present application, which will not limit the present application. For those skilled in the art, the present application can have various modifications and variations. Any modifications, equivalent replacements and improvements made within the spirits and principles of the present application shall all fall into the protection scope of the present application.

What is claimed is:

1. An end plate of a battery module, comprising a main body and an energy absorbing body, wherein the energy absorbing body comprises an acting portion and a connecting portion, the acting portion protrudes in a direction from the main body toward a battery, and the acting portion is connected with the main body through the connecting portion, and wherein the connecting portion is structured in a strip shape, one end of the connecting portion is fixedly connected with the main body, and the other end of the connecting portion is fixed at an edge of the acting portion.

2. The end plate of a battery module according to claim 1, wherein the main body has a connecting hole, the energy absorbing body is arranged at the connecting hole, and a surface of the energy absorbing body facing toward the connecting hole is a concave surface.

3. The end plate of a battery module according to claim 2, wherein a through hole is defined in the connecting portion, the through hole is communicated with the connecting hole.

4. The end plate of a battery module according to claim 1, wherein an auxiliary deforming hole is defined in the acting portion, and the auxiliary deforming hole penetrates through the acting portion.

5. The end plate of a battery module according to claim 1, wherein the connecting portion is obliquely arranged relative to a protruding direction of the acting portion, and the end of the connecting portion connected with the acting portion is closer to the acting portion than the other end of the connecting portion.

6. The end plate of a battery module according to claim 1, comprising a plurality of energy absorbing bodies, wherein the plurality of energy absorbing bodies is arranged on the main body and is spaced from each other.

7. The end plate of a battery module according to claim 6, wherein a surface of the acting portion of each energy absorbing body away from the main body is a flat surface, and the flat surfaces of all the acting portions are parallel and level to each other.

8. A battery module, comprising a rigid end plate and a plastic end plate, wherein the plastic end plate is arranged between a battery in the battery module and the rigid end plate, and the rigid end plate is the end plate of a battery module according to claim 1.

9. The battery module according to claim 8, wherein the plastic end plate comprises a plastic main body and a cooperative protruding portion fixed with the plastic main body, the cooperative protruding portion protrudes from the plastic main body toward a side close to the rigid end plate, and the cooperative protruding portion abuts with the acting portion.

* * * * *